United States Patent [19]

Kuo

[11] Patent Number: 4,591,703
[45] Date of Patent: May 27, 1986

[54] ANSWER BAR OF A CALCULATOR
[75] Inventor: Calven Kuo, Taipei, Taiwan
[73] Assignee: Aurora Mechatronics Corp., Taipei, Taiwan
[21] Appl. No.: 726,271
[22] Filed: Apr. 23, 1985
[51] Int. Cl.⁴ .............................................. G06C 7/02
[52] U.S. Cl. .............................................. 235/145 R
[58] Field of Search ........................... 235/145 R–146; 200/5 A

[56] References Cited
U.S. PATENT DOCUMENTS 3,472,449 10/1969 Marino et al. ............... 235/145 R X
3,962,556 6/1976 Kravchuck ................. 235/145 R X Primary Examiner—Benjamin R. Fuller
Attorney, Agent, or Firm—Sughrue, Mion, Zinn, Macpeak and Seas

[57] ABSTRACT

The present invention disclosed an improved calculator structure comprising a casing which has an operating panel, a calculating circuit board disposed in the casing, and a plurality of keys mounted on the calculating circuit board and extending out of the operating panel of the casing, in which an elongated answer bar is provided along the front end of the calculator, and the length of the answer bar approximates the width of the calculator.

1 Claim, 3 Drawing Figures

ANSWER BAR OF A CALCULATOR

BACKGROUND OF THE INVENTION

The present invention is related to an improved answer bar of a calculator, and more particularly to a calculator which utilizes an elongated answer bar, and arranges it along the front end of the calculator not only to make the operation more convenient for the user, but also to increase the accuracy of the operation.

All calculators share a few common features in that, they all have a plurality of keys, including ten numerical keys, four operation keys, and an answer key, which is often labelled with an "equal" sign. Some calculators further have several function keys for providing the user with several utility functions, such as memorization, continuous operation, printing function, etc., in order to satisfy some special needs. To make the operation of the calculator more convenient for the user, the calculator manufacturers have endeavored to discover the best way to arrange each key on the operating panel of the calculator. Although some keyboard arrangements used by the conventional calculators are worth appreciating, they still have one disadvantage due to the unsatisfactory placement of the answer key, which is the key most frequently used. The size and shape of the answer key is almost the same as the other keys, or is slightly larger in the conventional calculators, and it is usually located among the keys or on the lowest right corner. Thus, during operation of the calculator, the user must always use one single finger to push the keys, and must also pay attention to whether or not the operation of the answer key is correct, resulting in a low operating speed, and the fact that the user's attention is continually distracted. Furthermore, this may also cause the user to wrongly push the answer key, and therefore the operation is often interrupted, whereby the efficiency is reduced.

An improved answer bar of a calculator structure according to one preferred embodiment of the present invention intends to improve on the above-described inconveniences.

SUMMARY OF THE INVENTION

One object of the present invention is to provide an improved calculator structure which utilizes an elongated answer bar to facilitate the operation of the answer function.

Another object of the present invention is to provide an improved calculator structure which arranges the answer bar along the front end of the calculator.

Yet another object of the present invention is to provide an improved calculator structure which makes the length of the answer bar approximate the width of the calculator.

In accordance with the present invention, an improved calculator structure comprises a casing which has an operating panel, a calculating circuit board disposed in the casing, and a plurality of keys mounted on the calculating circuit board and extending out of the operating panel of the casing, in which an elongated answer bar is provided.

BRIEF DESCRIPTION OF THE DRAWINGS

The present invention will be more fully understood from the following detailed description, taken in connection with the accompanying drawings which form an integral part of this application and in which.

DETAILED DESCRIPTION OF THE PREFERRED EMBODIMENTS

Figure 1:
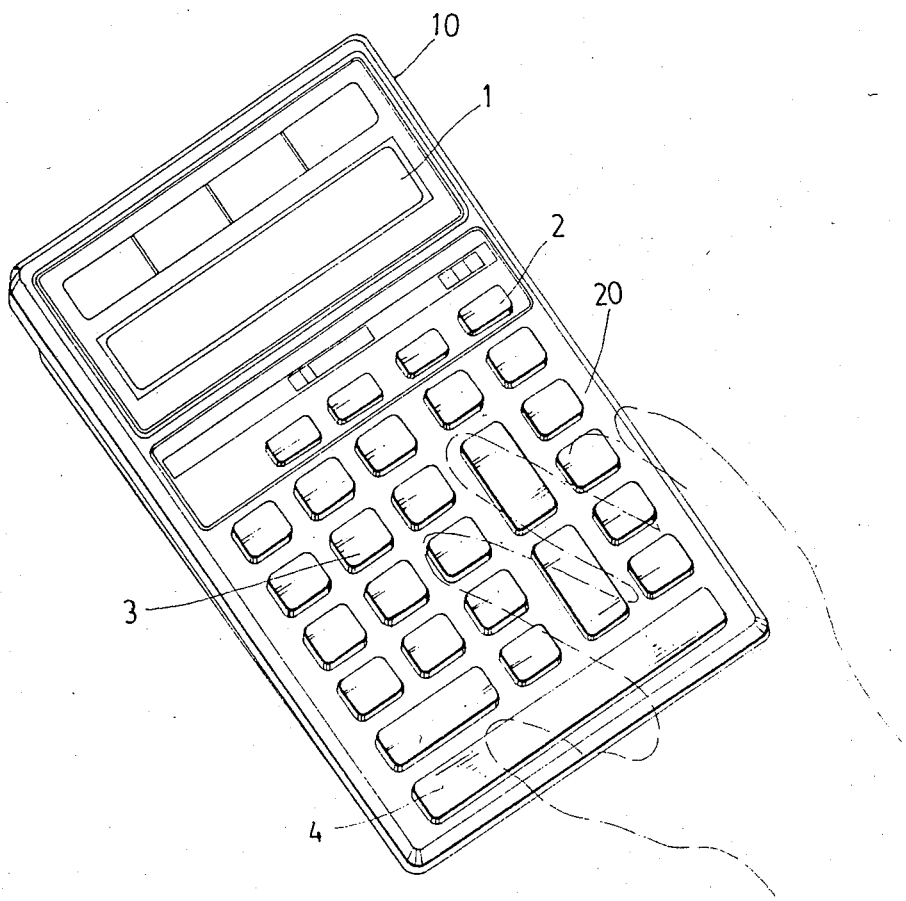
FIG. 1 is a perspective view of a pocket calculator in accordance with one preferred embodiment of the present invention.

Referring now to the drawings, it should be noted that a like member is designated with a like reference number. In FIG. 1, there is shown a pocket calculator which includes a casing 10 having an operating panel 20, a calculating circuit board (not shown) disposed in the casing, and a plurality of keys mounted on the calculating circuit board and extending out of the operating panel 20 of the casing 10. There is also a display window 1 on the casing 10. The keys consist of a plurality of function keys 2, a plurality of numerical keys 3, and an answer bar 4. It should be noted that the interior structure and the casing 20 of the calculator are not features of the present invention, and thus, further description is deemed not to be needed. The main feature of the present invention, the shape, size, and arrangement of the answer bar 4, will be described in detail hereinafter.

The answer bar 4 is in an elongated shape, and its length approximates the width of the calculator. The answer bar 4 is preferably arranged along the front end of the calculator. According to such a calculator structure, the thumb of a user's hand shown by phantom line can keep resting on the answer bar 4, while he uses the other four fingers to operate the other keys. Therefore, the user no longer needs to give attention to the answer bar 4 when in the process of calculating, and a wrong push of the answer bar 4 will not happen frequently, resulting in an increase in the operating efficiency.

Figure 2:
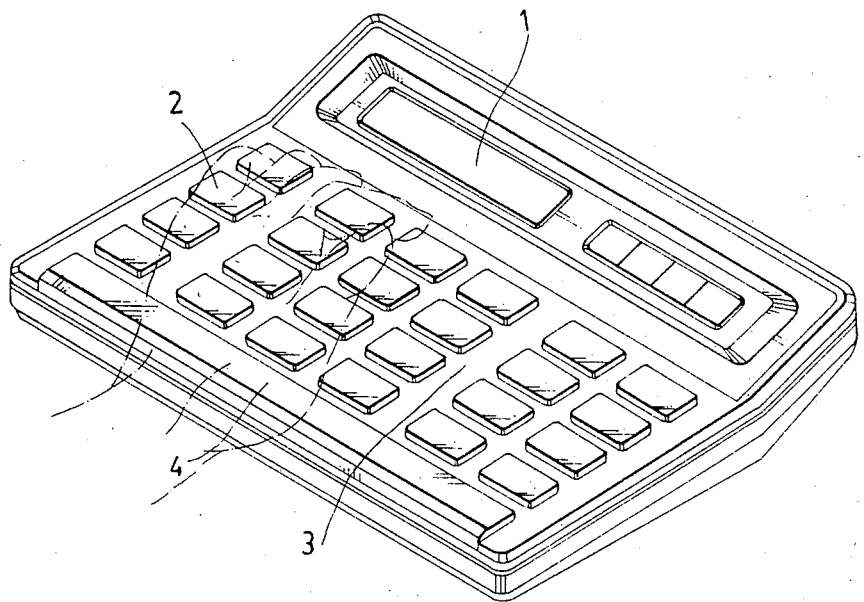
FIG. 2 is a perspective view of an on-table type calculator in accordance with the other preferred embodiment of the present invention.
Figure 3:
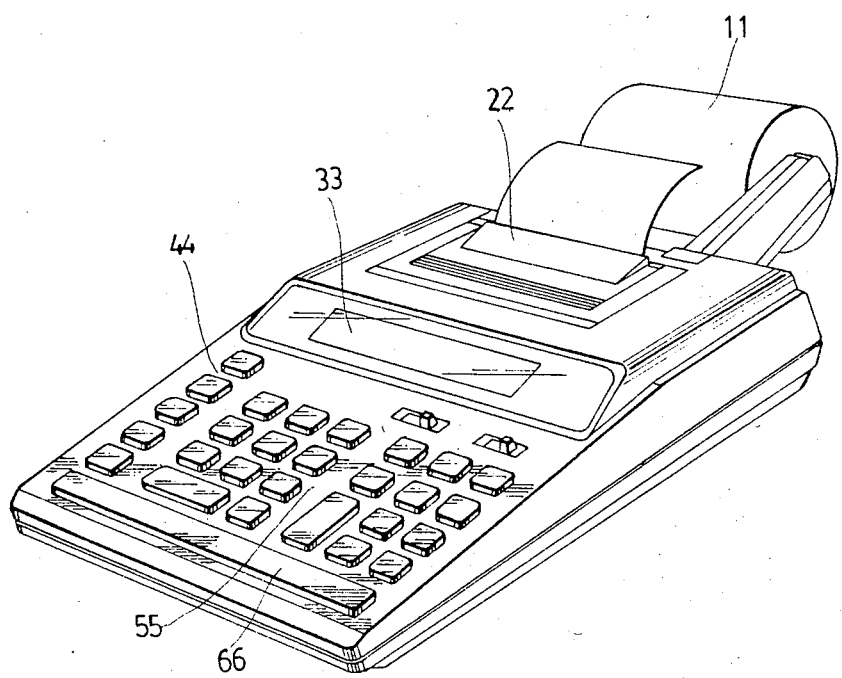
FIG. 3 is a perspective view of a calculator with a listing device in accordance with the other preferred embodiment of the present invention.

In FIG. 2, there is shown an on-table calculator which utilizes the structure of the present invention. In this case, the user can alternatively use his palm to push the answer bar 4 as shown by phantom line if desires, and is also convenienced with the advantages mentioned above. Referring to FIG. 3, the structure of the present invention can also be applied to a calculator with a listing device which includes a printing paper section 11, a printing section 22, a display window 33, a plurality of function keys 44, a plurality of numerical keys 55, and an answer bar 66. Its features and advantages are the same as those described above.

While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims which scope is to be accorded the broadest interpretation so as to encompass all such modification and equivalent structures.

What is claimed is:

1. A numerical calculator, comprising: a casing having an operating panel, a calculating circuit board disposed in said casing, a plurality of numeral entry and function keys mounted on said calculating circuit board and projecting out of said operating panel of said casing, and an elongated answer bar projecting out of said operating panel and extending substantially across a full width of said panel below the numerical entry and function keys and along a front end of said panel to facilitate ready depression by a thumb or palm heel of a user's hand.

* * * * *